United States Patent
Kojima et al.

(10) Patent No.: US 6,957,444 B2
(45) Date of Patent: Oct. 18, 2005

(54) OPTICAL DISK AND METHOD OF PRODUCING THE SAME

(75) Inventors: Takeo Kojima, Kanagawa-Ken (JP); Toyohito Asanuma, Yokohama (JP)

(73) Assignee: Victor Company of Japan, Ltd. (JP)

(*) Notice: Subject to any disclaimer, the term of this patent is extended or adjusted under 35 U.S.C. 154(b) by 279 days.

(21) Appl. No.: 10/396,663

(22) Filed: Mar. 25, 2003

(65) Prior Publication Data

US 2003/0210644 A1 Nov. 13, 2003

(30) Foreign Application Priority Data

Mar. 29, 2002 (JP) ........................................ 2002-094347
Nov. 22, 2002 (JP) ........................................ 2002-339342

(51) Int. Cl.[7] .............................................. G11B 17/03
(52) U.S. Cl. ..................................................... 720/718
(58) Field of Search ................................ 720/718, 719; 369/112, 275.2, 275.4, 283, 288; 428/64.7

(56) References Cited

U.S. PATENT DOCUMENTS

| | | | | |
|---|---|---|---|---|
| 5,972,459 A | * | 10/1999 | Kawakubo et al. | ........ 428/64.1 |
| 6,177,176 B1 | * | 1/2001 | Tanabe et al. | ............... 428/192 |
| 6,246,656 B1 | * | 6/2001 | Kawakubo et al. | .... 369/112.23 |
| 2003/0148060 A1 | * | 8/2003 | Nishizawa et al. | ........ 428/64.7 |

FOREIGN PATENT DOCUMENTS

| | | |
|---|---|---|
| JP | 2000-311392 | 11/2000 |
| JP | 2000-340815 | * 12/2000 |
| JP | 2001-243658 | 9/2001 |
| JP | 2001-243659 | 9/2001 |

* cited by examiner

Primary Examiner—Allen Cao
(74) Attorney, Agent, or Firm—Renner, Kenner, Greive, Bobak, Taylor & Weber

(57) ABSTRACT

An optical disk includes a reflective layer, a recording layer, an optical-transparent bonding layer and an optical transparent sheet laminated on a substrate in this order. The total thickness of the optical-transparent bonding layer and the optical transparent sheet is 0.1 mm. The peak-to-peak height of wrinkles formed on the sheet is 2.5 μm or lower. The optical disk is produced as follows: A first ultraviolet ray is radiated to an optical transparent sheet at a first energy level in the range from 500 mJ/cm² to 3000 mJ/cm², a wavelength of the first ultraviolet ray being in the range from 250 nm to 300 nm. Prepared next is a substrate laminated on which are a reflective layer and a recording layer in this order. Ultraviolet hardened resin is applied on the recording layer to form an optical-transparent bonding layer thereon. An optical transparent sheet is provided on the optical-transparent bonding layer. A second ultraviolet ray is radiated to the optical transparent sheet at a second energy level the same as or lower than the first energy level, to harden the optical-transparent bonding layer, thus the optical transparent sheet being bonded on the substrate via the optical-transparent bonding layer.

3 Claims, 4 Drawing Sheets

OPTICAL DISK AND METHOD OF PRODUCING THE SAME

BACKGROUND OF THE INVENTION

The present invention relates to an optical disk having one or two recording layers and a method of producing such an optical disk, exhibiting enhanced focusing-error free characteristics at high rotating speed.

High-density optical disks have been developed with the help of high aperture ratio for lenses and short wavelength for lasers.

The next generation optical disks require a thin optical transparent layer coated thereon, to achieve a short distance between an objective lens of an optical pickup and the disk surface, for suppressing lens astigmatism. This is because a large astigmatism will be expected when an optical disk is inclined on a recording/reproduction apparatus due to warpage etc., in proportion to the distance between the objective lens and the disk surface.

Also required to the next generation optical disks is a tolerable range of focusing errors, which occur due to disk-surface vibration.

A method of producing optical disks which overcome such drawbacks is disclosed in Japanese Unexamined Patent Publication No. 2000-311392.

In summary, an optically transparent polymer sheet is annealed at temperature in the range from −20° C. to +80° C. against the polymer thermal-deformation temperature. A recording and a bonding layer are formed on a substrate in this order via the annealed polymer sheet attached to the bonding layer. The bonding layer and the attached polymer sheet constitute an optical transparent layer. Bonding the polymer sheet to the bonding layer decreases winkles formed on the sheet, thus offering a uniform thickness to the optical transparent layer.

Discussed with reference to FIG. 1 is focusing errors due to disk-surface vibration at 10 KHz or lower in disk rotating speed, due to the fact that errors could be indirectly measured through reproduced signals from an optical disk at several ten 10 KHz or higher.

The frequency characteristics shown in FIG. 1 indicate disk-surface vibration against disk rotating speed at 5.3 m/s in linear velocity in reproduction (the same characteristics observed in recording).

The ordinate and the abscissa in FIG. 1 are the disk-surface vibration and the disk rotating speed, respectively, both on logarithmic scale.

A critical line R in FIG. 1 indicates the critical border at which focusing errors will occur. The zone P below the critical line R is a focusing-adjustable zone in which disk-surface vibration can be suppressed by a servo circuitry of an optical pickup, thus accurate focusing on the signal-recorded region on an optical disk being achieved. On the contrary, the zone Q above the critical line R is a focusing-unadjustable zone in which disk-surface vibration cannot be suppressed by the servo circuitry, thus accurate focusing on the signal-recorded region being not achieved.

Observed in FIG. 1 is that the disk-surface vibration exhibits frequency dependency on disk rotation frequency in each of the following ranges: range (A) from 1 Hz to 36 Hz, range (B) from 36 Hz to 1100 Hz and range (c) from 1100 Hz to 10000 Hz.

The frequency characteristics teach the followings:

In the range (A) from 1 Hz to 36 Hz, focusing is adjustable against disk-surface vibration up to 100 $\mu$m.

In the range (B) from 36 Hz to 1100 Hz, focusing-adjustable disk-surface vibration is linearly decreased as the disk rotation frequency is increased. In detail, focusing is adjustable against disk-surface vibration up to 100 $\mu$m at frequency in the range from 1 Hz to 36 Hz whereas adjustable up to 0.09 $\mu$m at 1100 Hz.

In the range (C) from 1100 to 10000 Hz, focusing is adjustable against disk-surface vibration at 0.09 $\mu$m or lower.

As understood from FIG. 1, focusing errors can be corrected little at high disk rotation frequency, particularly, it cannot be corrected if disk-surface vibration is not suppressed to 0.09 $\mu$m or lower in the range (C).

Optical disks produced by the method disclosed in Japanese Unexamined Patent Publication No. 2000-311392 exhibit less variation in film thickness for optical transparent layers whereas exhibiting disk-surface vibration over 0.09 $\mu$m, thus focusing unadjustable.

SUMMARY OF THE INVENTION

A purpose of the present invention is to provide an optical disk and a method of producing an optical disk, achieving correction of focusing errors even at high disk-rotation frequency ranges.

The present invention provides an optical disk comprising: a reflective layer formed on a substrate; a recording layer formed on the reflective layer; an optical-transparent bonding layer formed on the recording layer; and an optical transparent sheet formed on the optical-transparent bonding layer, the total thickness of the optical-transparent bonding layer and the optical transparent sheet being 0.1 mm, the peak-to-peak height of wrinkles formed on the sheet being 2.5 $\mu$m or lower.

Moreover, the present invention provides a method of producing an optical disk comprising the steps of: radiating a first ultraviolet ray to an optical transparent sheet at a first energy level in the range from 500 mJ/cm$^2$ to 3000 mJ/cm$^2$, a wavelength of the first ultraviolet ray being in the range from 250 nm to 300 nm; preparing a substrate laminated on which are a reflective layer and a recording layer in this order; applying ultraviolet hardened resin on the recording layer to form an optical-transparent bonding layer thereon; providing the optical transparent sheet on the optical-transparent bonding layer; and radiating a second ultraviolet ray to the optical transparent sheet at a second energy level the same as or lower than the first energy level, to harden the optical-transparent bonding layer, thus the optical transparent sheet being bonded on the substrate via the optical-transparent bonding layer.

DETAILED DESCRIPTION OF PREFERRED EMBODIMENTS

Preferred embodiments according to the present invention will be disclosed with reference to the attached drawings.

Figure 1:
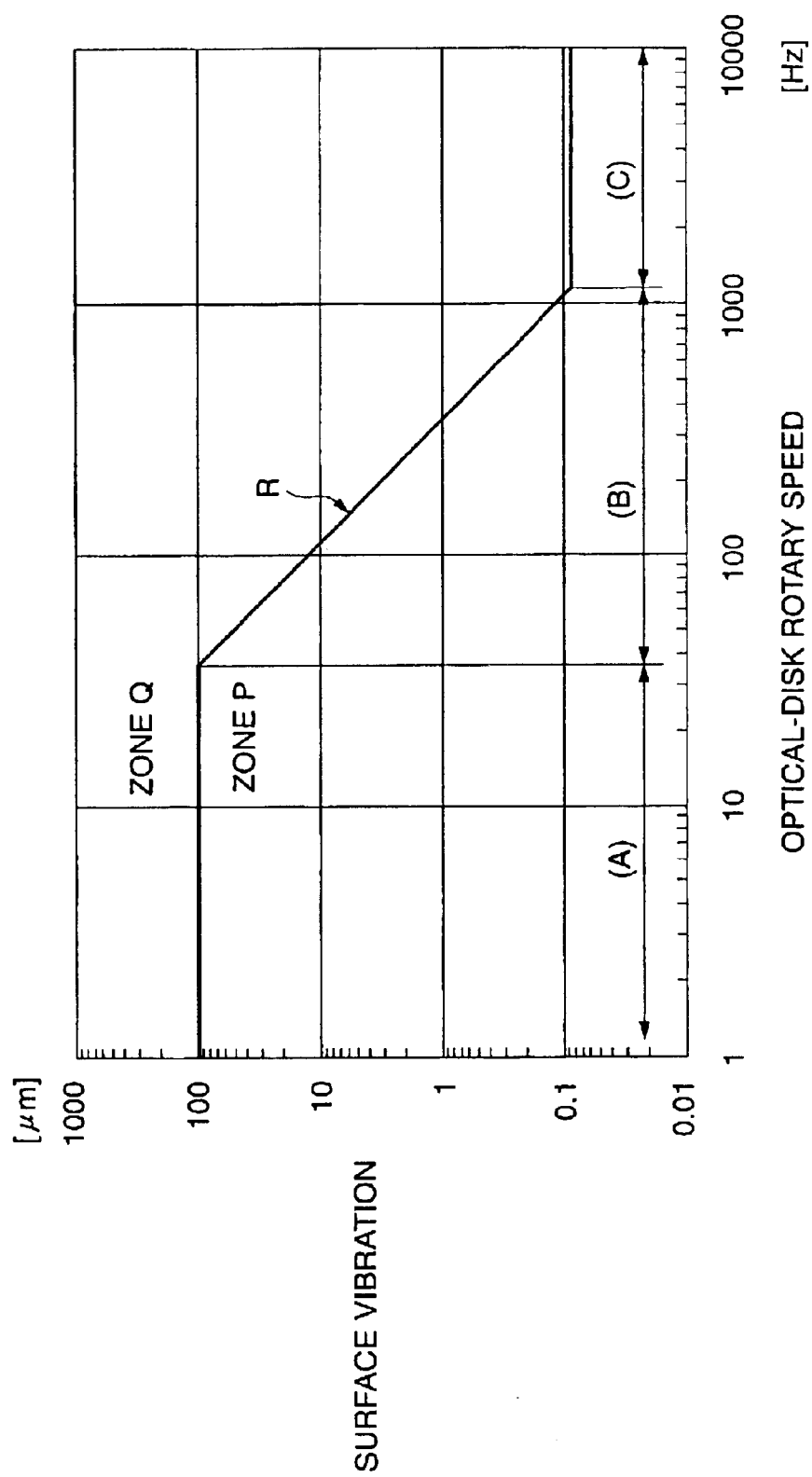
FIG. 1 shows frequency characteristics indicating disk-surface vibration against disk rotating speed at 5.3 m/s in linear velocity in reproduction.
Figure 2:
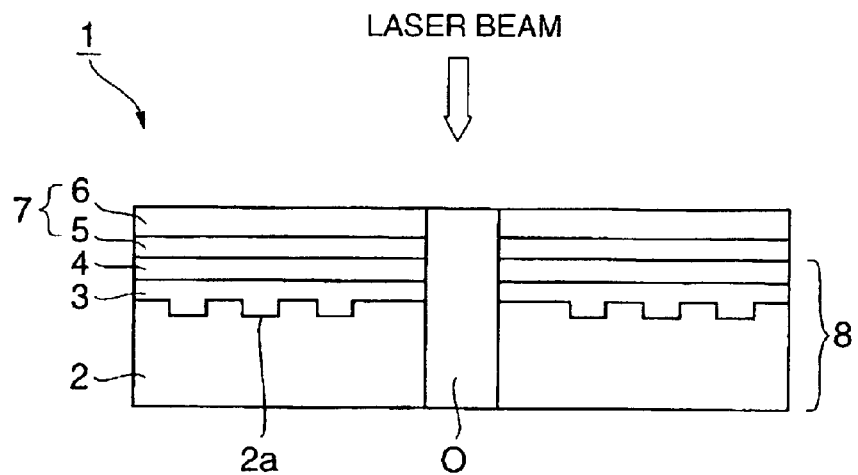
FIG. 2 shows a cross section of an optical disk according to the present invention.

As shown in FIG. 2, an optical disk 1 according to the present invention has a metallic reflective layer 3, a Ge—Sb—Te-made recording layer 4, an optical-transparent bonding layer 5 made of ultraviolet hardened resin and an optical transparent sheet 6, laminated in this order on a signal-recording surface 2a of a polycarbonate circular disk substrate 2. Formed in the center of the optical disk 1 is a through hole 0 penetrating the laminated layers.

The optical-transparent bonding layer 5 and the optical transparent sheet 6 constitute an optical transparent layer 7 having a thickness of 0.1 mm.

Formed on the signal-recording surface 2a of the disk substrate 2 is a train of pits or grooves with concavities and convexities.

The disk substrate 2 has 120 mm and 15 mm in outer and inner diameters, respectively. The optical transparent sheet 6 has 90 $\mu$m in thickness, and 119 mm and 20 mm in outer and inner diameters, respectively.

The optical-transparent bonding layer 5 may be made of ultraviolet-hardened type material such as EX8204 manufactured by DAI NIPPON INK INCORPORATED.

The manufacturing specifications for the optical disk 1 are 0.1 $\mu$m in thickness of the optical transparent layer 7 and 2.5 $\mu$m or lower in peak-to-peak height of wrinkles formed on the optical transparent sheet 6, for focus adjustments in recording/reproduction with a laser beam incident to the optical transparent sheet 6 at 5.3 m/s in linear velocity.

Disclosed next with reference to FIGS. 2 to 6 is a method of producing the optical disk 1 according to the present invention.

Prepared first are layer-laminated substrates 8 in each of which the reflective layer 3 and the recording layer 4 have been laminated in this order on the disk substrate 2.

Figure 3:
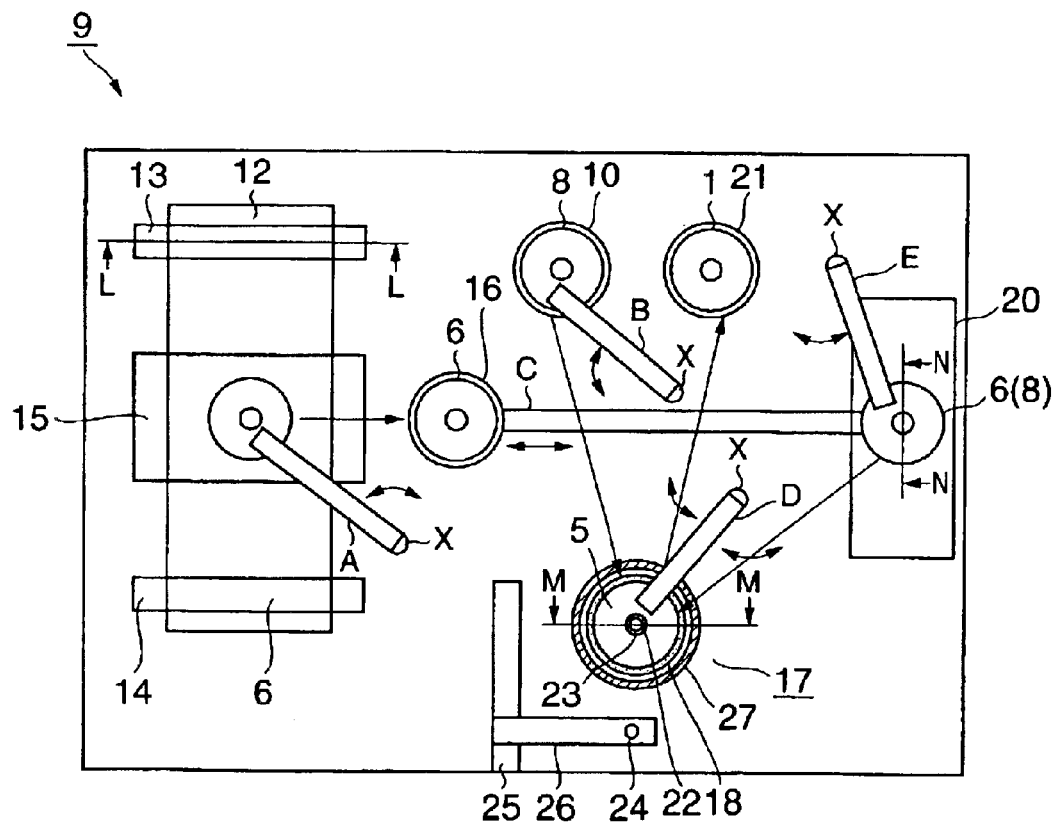
FIG. 3 shows a plan view of a manufacturing machine for producing the optical disk shown in FIG. 2.

The layer-laminated substrates 8 are set on a manufacturing machine 9 shown in FIG. 3.

The manufacturing machine 9 consists of first to fourth sections as follows:

The first section incorporates: a substrate supplier 10 on which the layer-laminated substrates 8 are set; a sheet supply roller 13 on which an original sheet 12 made of the optical transparent sheet 6 coated with a protective sheet 11 is set (FIGS. 3 and 4) and the sheet 6 is fed out after peeled off from the protective sheet 11; and a sheet take-up roller 14 for taking up the optical transparent sheet 6.

The second section incorporates: a sheet cutter 15, provided between the sheet supply roller 13 and the sheet take-up roller 14, for cutting the optical transparent sheet 6 into disks the same size as the layer-laminated substrates 8; a first transfer unit A for transferring the disk-shape optical transparent sheets 6; a sheet table 16 on which each transferred disk-shape sheet 6 is placed; a second transfer unit B for transferring each layer-laminated substrate 8 from the substrate supplier 10 to a rotary table 18; and a spin coater 17 for coating the optical-transparent bonding layer 5 made of ultraviolet hardened resin on each substrate 8 set on the rotary table 18.

The third section incorporates: a third transfer unit C for shifting the sheet table 16 to transfer each disk-shape optical transparent sheet 6 placed thereon and returning the sheet table 16 to its original position after the sheet 6 is exposed to ultraviolet rays, as described later; and a fourth transfer unit D for transferring each disk-shape optical transparent sheet 6 coated on the layer-laminated substrate 8 and placed on the rotary table 18 and retuning the disk-shape sheet 6 to the table 18 after exposed to ultraviolet rays.

The fourth section incorporates: a ultraviolet-ray radiation unit 20 for radiating ultraviolet rays to each disk-shape optical transparent sheet 6 set on the rotary table 18 by the fourth transfer unit C or the optical transparent sheet 6 coated on each layer-laminated substrate 8; a fifth transfer unit E for transferring the optical disks 1 each made of the substrate 8 and the sheet 6 coated thereon and hardened by exposure to the ultraviolet rays; and a storage 21 for storing the optical disks 1.

Figure 5:
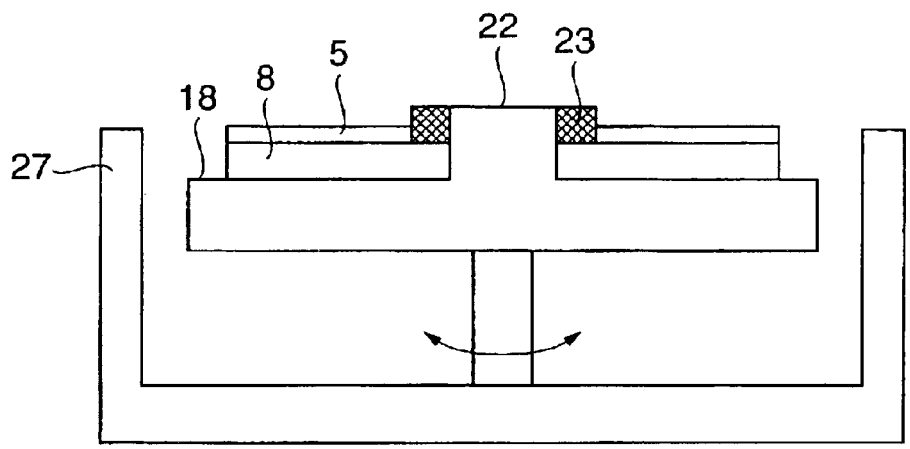
FIG. 5 shows a cross section taken on line M—M in FIG. 3.

As shown in FIGS. 3 and 5, the spin coater 17 consists of: the circular rotary table 18 having a center shaft 22 of a diameter the same as the inner diameter of each layer-laminated substrate 8 and a spacer 23 placed on the substrate 8 as the shaft 22 is fit in the spacer 23; a transfer arm 26 having a nozzle 24 at the front end, the rear end being fixed on a mount 25, the nozzle 24 spraying the ultraviolet hardened resin while the arm 26 is traversing over the rotary table 18 in reciprocating motion so as to form the optical-transparent bonding layer 5 on each substrate 8; and a coat house 27 formed around the rotary table 18 for receiving excessive ultraviolet hardened resin scattered outside due to centrifugal force while the table 18 is rotating, as indicated by arrows in FIG. 5, during coating each substrate 8 with the sprayed resin.

Figure 6:
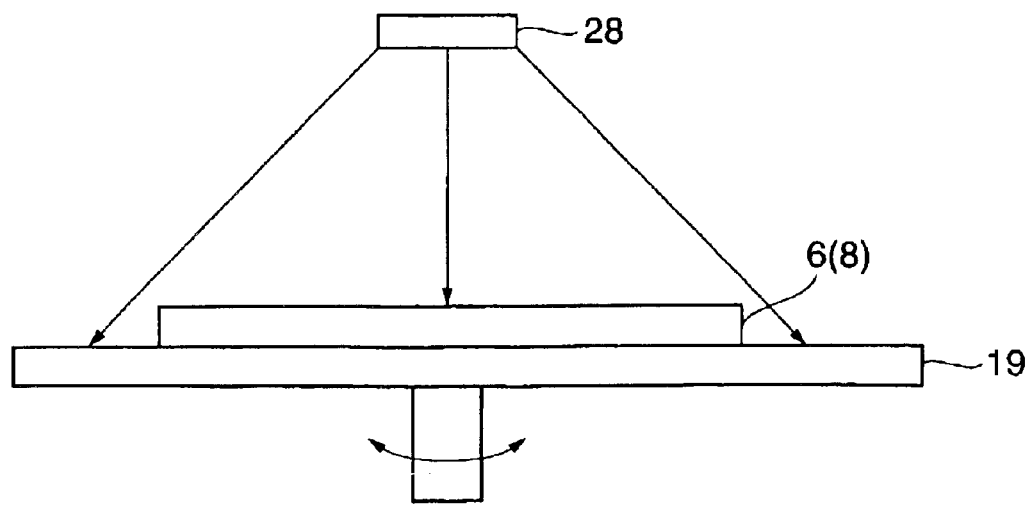
FIG. 6 shows a cross section taken on line N—N in FIG. 3.

As illustrated in FIG. 6, the ultraviolet-ray radiation unit 20 consists of a rotary table 19 on which each layer-laminated substrate 8 coated with the optical-transparent bonding layer 5 is placed and a ultraviolet lamp 28 for radiating ultraviolet rays, as indicated by arrows, to each substrate 8 or disk-shape optical transparent sheet 6 placed on the table 19 while rotating as indicated by arrows. The ultraviolet lamp 28 may be a high-pressure mercury lamp or a metal halide lamp, etc.

Each of the first, the second, the fourth and the fifth transfer units A, B, D and E rotates around the center X at a given angle in a direction indicated by an arrow as shown in FIG. 3.

Disclosed next is a method of producing the optical disk 1 with the manufacturing machine 9 according to the invention.

[Optical-Transparent-Sheet Cutting Process]

Figure 4:
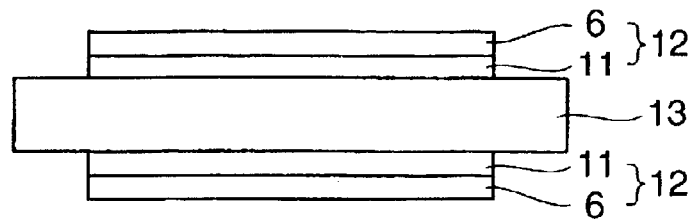
FIG. 4 shows a cross section taken on line L—L in FIG. 3.

The sheet supply roller 13 starts to peel off the optical transparent sheet 6 from the protective sheet 11, as illustrated in FIG. 4. The sheet 11 is taken up by a roller (not shown). The sheet 6 is then supplied to the sheet take-up roller 14 to take up the sheet 6. The sheet 6 is cut into disks the same size as the layer-laminated substrates 8 by the sheet cutter 15 provided between the sheet supply roller 13 and the sheet take-up roller 14.

[Optical-Transparent Sheet Ultraviolet-Ray Radiation Process]

Each disk-shape optical transparent sheet 6 is placed on the sheet table 16 by the first transfer unit A, as shown in FIG. 3. The sheet table 16 is then shifted by the third transfer unit C to the ultraviolet-ray radiation unit 20 to place the disk-shape sheet 6 on the rotary table 19.

The ultraviolet lamp 28 of the ultraviolet-ray radiation unit 20 radiates a first ultraviolet ray onto the disk-shape optical transparent sheet 6 at a first energy level while the rotary table 19 is rotating at a given speed.

Discussed next is how disk-shape optical transparent sheets 6 suffer wrinkling little through the production method disclosed above.

The disk-shape optical transparent sheets 6 have a molecular structure that absorbs ultraviolet rays of wavelength in the range from 250 nm to 300 nm. Therefore, when exposed to the first ultraviolet ray in this range of wavelength at the first energy level in the range from 500 mJ/cm$^2$ to 3000 mJ/cm$^2$, the internal stress of each sheet 6 will be relieved due to annealing by the first ultraviolet ray so that the sheet 6 is allowed to return to its original state, thus suffering wrinkling little.

In contrast, ultraviolet radiation at the energy level below 500 mJ/cm$^2$ will cause deformation of the disk-shape optical transparent sheets 6 due to no annealing effects whereas over 3000 mJ/cm$^2$ will cause thermal deformation, thus resulting in large wrinkles. Thus, the energy level in the range from 500 mJ/cm$^2$ to 3000 mJ/cm$^2$ is the necessary requirement in formation of the optical transparent sheets 6 in the production method according to the present invention.

Each disk-shape optical transparent sheet 6 exposed to the first ultraviolet ray at the first energy level in the range discussed above is sucked to a suction means (not shown) provided on the fourth transfer unit D. The sheet table 16 is then returned to it original position by the third transfer unit C (waiting mode).

[Substrate Preparation Process]

Each layer-laminated substrate 8 is placed on the substrate supplier 10, as the recording-layer side is set front.

[Bonding-Layer-On-Substrate Coating Process]

Each layer-laminated substrate 8 is transferred from the substrate supplier 10 to the rotary table 18 of the spin coater 17 by the second transfer unit B. The transfer arm 26 traverses over the rotary table 18 while rotating at a given speed, to spray the ultraviolet hardened resin from the nozzle 24 onto the recording layer 4 of the substrate 8 to form the optical-transparent bonding layer 5 thereon. The rotary table 18 stops rotating and the transfer arm 26 stops spraying when a sufficient amount of bonding layer 5 is formed on the substrate 8. The transfer arm 26 returns to its original position.

[Bonding Process]

Each disk-shape optical transparent sheet 6 exposed to the first ultraviolet ray is set, by the fourth transfer unit D, on the layer-laminated substrate 8 via the optical-transparent bonding layer 5 placed on the rotary table 18. The requirement here is that the sheet 6 subjected to exposure to the ultraviolet ray from the ultraviolet lamp 28 of the ultraviolet-ray radiation unit 20, be placed upward.

The placement of the disk-shape optical transparent sheet 6 on the optical-transparent bonding layer 5 causes the bonding layer 5 to stretch due to the weight of the sheet 6. The rotary table 18 starts rotation at high speed when the bonding layer 5 has stretched to the best position, thus the sheet 6 being bonded on the substrate 8 via the bonding layer 6.

The rotation requirements for the rotary table 18 are time and speed so that the bonding layer 5 and the sheet 6 have 0.1 mm in the total thickness. The rotation speed and time are, for example, 5000 rpm and 15 sec., respectively.

The excess ultraviolet hardened resin components scattered outside the rotary table 18 due to centrifugal force are flown into the coat house 27.

During rotation of the rotary table 18, the disk-shape optical transparent sheet 6 is exposed to and thus annealed by the first ultraviolet ray of wavelength in the range from 250 nm to 300 nm at the first energy level in the range from 500 mJ/cm$^2$ to 3000 mJ/cm$^2$. The optical-transparent bonding layer 5 exhibits low viscosity, so that it enters deep into wrinkles of the sheet 6 if there are, thus causing very small irregularity when bonded.

[Ultraviolet-Ray Radiation Process]

Each substrate 8 formed the optical transparent sheet 6 thereon via the optical-transparent bonding layer 5 is transferred by the fourth transfer unit D and placed on the rotary table 19 as the sheet 6 is set front in the ultraviolet-ray radiation unit 20.

The substrate 8 is then exposed to a second ultraviolet ray at a second energy level in the range from 500 mJ/cm$^2$ to 3000 mJ/cm$^2$ the same as the first energy level through the optical transparent sheet 6, to harden the optical-transparent bonding layer 5 while the rotary table 19 is rotating. Thus, the sheet 6 is completely bonded on the substrate 8 to finish the optical disk 1 shown in FIG. 2. The rotary table 19 stops rotation.

The wavelength of the second ultraviolet ray is in the range from 250 nm to 400 nm. The second energy level may be lower than the first energy level for hardening the optical-transparent bonding layer 5. Nevertheless, the same first and second energy level serves to suppress generation of wrinkles during bonding, thus further minimizing the peak-to-peak height of wrinkles.

[Optical-Disk Storage Process]

Each optical disk 1 produced as above is transferred by the fifth transfer unit E from the rotary table 19 to the storage 21.

Discussed next are observations on focusing errors caused to the optical disks.

Sample optical disks 1 to 4 were produced with the first ultraviolet ray to the optical transparent sheet 6 at the first energy level in the range from 500 mJ/cm$^2$ to 3000 mJ/cm$^2$, according to the present invention.

Also produced were comparative sample optical disks 1 to 3 with the ultraviolet ray to the optical transparent sheet 6 at the energy level out of the range of the present invention 6.

The quality of each optical transparent sheet 6 was examined for wrinkles formed thereon with the reference level 0.09 $\mu$m in disk-surface vibration that is the critical point for focusing-error correction when the optical disk 1 of the present invention rotates at high speed. In detail, the quality on wrinkles was judged as good when the surface vibration is 0.09 $\mu$m or lower whereas it was judged as bad over 0.09 $\mu$m.

The disk-surface vibration was measured by the recorder/reproducer LM330A made by Shibasoku, Co, Ltd. The peak-to-peak height of wrinkles on the optical transparent sheets 6 was measured by the surface measurement instrument (Shimadzu Co, Ltd, Talysurf).

These measurements were conducted at a position of 23 mm in radius while the optical disks were rotating at linear velocity of 5.3 m/s. The wavelength of the first ultraviolet ray to the optical transparent sheets 6 was in the range from 250 nm to 300 nmm.

The results were shown in TABLE 1 below.

TABLE 1

| SAMPLE No. | EXPOSED SURFACE | ENERGY LEVEL (mJ/cm$^2$) | WRINKLE P—P HEIGHT($\mu$m) | SURFACE VIBRATION ($\mu$m) |
| --- | --- | --- | --- | --- |
| SAMPLE 1 | SINGLE SIDE | 500 | 2.5 | 0.085 |
| SAMPLE 2 | SINGLE SIDE | 1500 | 1.8 | 0.051 |
| SAMPLE 3 | SINGLE SIDE | 3000 | 1.0 | 0.033 |
| SAMPLE 4 | BOTH SIDES | 1500 | 1.8 | 0.051 |
| COM SAMPLE 1 | SINGLE SIDE | 0 | 5.3 | 0.18 |
| COM SAMPLE 2 | SINGLE SIDE | 400 | 4.0 | 0.16 |
| COM SAMPLE 3 | SINGLE SIDE | 3500 | 3.0 | 0.23 |

The P—P (Peak-to-Peak) wrinkle height shown in TABLE 1 indicates the maximum difference in the highest wrinkle and the lowest wrinkle.

The first energy levels of ultraviolet rays were 500 mJ/cm$^2$ to the sample 1, 1500 mJ/cm$^2$ to the sample 2, 3000 mJ/cm$^2$ to the sample 3 and 1500 mJ/cm$^2$ to the sample 4, in the present invention.

In contrast, the energy levels of ultraviolet rays to the comparative samples were 0 mJ/cm$^2$ to the comparative sample 1, 400 mJ/cm$^2$ to the comparative sample 2 and 3500 mJ/cm$^2$ to the comparative sample 3.

Radiation of the ultraviolet rays were performed to the single side of the optical transparent sheet 6 for the samples 1 to 3 (the invention) and also the comparative samples 1 to 3 whereas to the both sides of the sheet 6 for the sample 4 (the invention).

As shown in TABLE 1, the peak-to-peak height of wrinkles were 2.5 $\mu$m, 1.8 $\mu$m, 1.0 $\mu$m and 1.8 $\mu$m for the samples 1 to 4, respectively, according to the present invention whereas over 2.5 $\mu$m for the comparative samples 1 to 3.

Moreover, as shown in TABLE 1, the surface vibration were 0.085 $\mu$m, 0.051 $\mu$m, 0.033 $\mu$m and 0.051 $\mu$m for the samples 1 to 4, respectively, according to the present invention whereas over 0.09 $\mu$m for the comparative samples 1 to 3.

The peak-to-peak heights of wrinkles were 2.5 $\mu$m or lower for the samples according to the present invention, thanks to annealing by the first ultraviolet ray which possibly relieved the internal stress from the optical transparent sheet 6 drastically.

The results teach that the disk-surface vibration can be suppressed to 0.09 $\mu$m or lower at which focusing error are correctable, with the peak-to-peak height of wrinkles of 2.5 $\mu$m or lower and the first ultraviolet ray in the range from 250 nm to 300 nm in wavelength and in the range from 500 mJ/cm$^2$ to 3000 mJ/cm$^2$ in the first energy level.

As discussed above, the embodiments of the present invention offer the optical disk 1 having the total thickness of 0.1 mm for the optical-transparent bonding layer 5 and the optical transparent sheet 6 and the peak-to-peak height of wrinkles of 2.5 $\mu$m or lower for the sheet 6, exhibiting the surface vibration of 0.09 $\mu$m or lower, thus focusing error correctable.

Moreover, the first ultraviolet ray in the range from 250 nm to 300 nm in wavelength and in the range from 500 mJ/cm$^2$ to 3000 mJ/cm$^2$ in the first energy level to the optical transparent sheet 6 before bonded to the substrate 8 via the bonding layer 5, serves to minimize the peak-to-peak height of wrinkles to 2.5 $\mu$m or lower.

Figure 7:
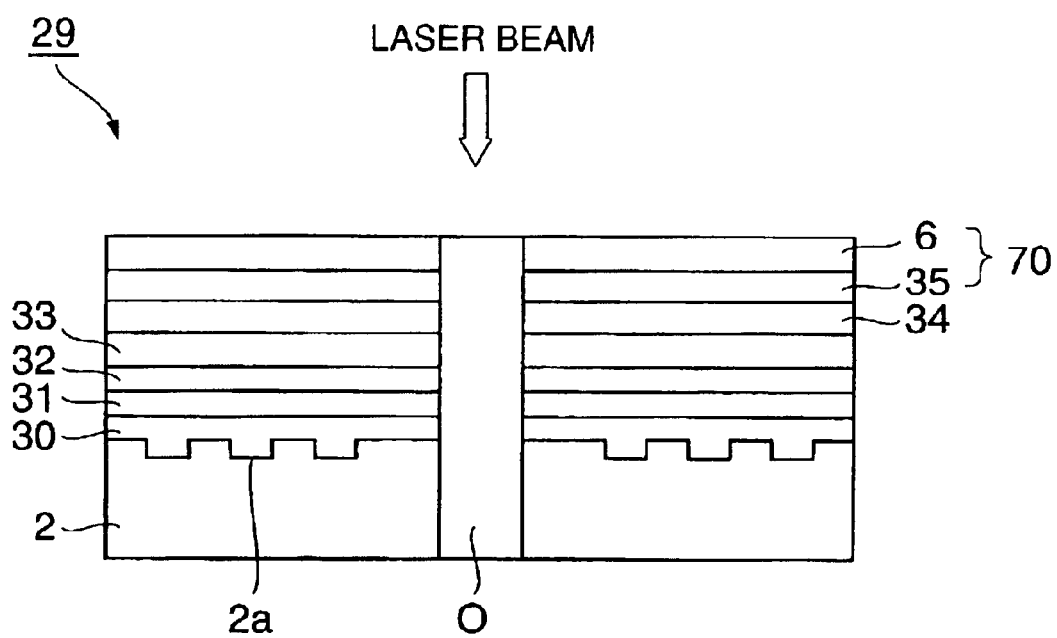
FIG. 7 shows a cross section of a modification to the optical disk according to the present invention.

Disclosed next with reference to FIG. 7 is a double-layer optical disk having two recording layers, as a modification to the present invention.

Elements shown in FIG. 7 the same as or analogous to the elements shown in FIG. 2 are referenced by the same numerals and not explained in detail.

As shown in FIG. 7, a double-layer optical disk 29 according to the present invention has a first reflective layer 30, a first recording layer 31, a first optical-transparent bonding layer 32, a second reflective layer 33, a second recording layer 34, a second optical-transparent bonding layer 35 and an optical transparent sheet 6, laminated in this order on a signal-recording surface 2a of a polycarbonate circular disk substrate 2. Formed in the center of the optical disk 29 is a through hole 0 penetrating the laminated layers.

The second reflective layer 33 is made of a semi-transparent film. Although not shown, another signal-recording surface, different from the signal-recording surface 2a, is formed the first optical-transparent bonding layer 32 by photopolymerization using a transparent stamper.

The second optical-transparent bonding layer 35 and the optical transparent sheet 6 constitute an optical transparent layer 70 having a thickness of 0.1 mm.

The first and the second recording layers 31 and 34 are made of the material the same as for the recording layer 4 shown in FIG. 2.

Moreover, the first and the second optical-transparent bonding recording layers 32 and 35 are made of the material the same as for the optical-transparent bonding layer 5 shown in FIG. 2.

Although not discussed, it is understood by those skilled in the art that the double-layer optical disk shown in FIG. 7 has the same advantages as the optical disk shown in FIG. 2.

As disclosed above, the optical disk according to the present invention has a reflective layer, a recording layer, an optical-transparent bonding layer and an optical transparent sheet, laminated in this order on a substrate. Another set of a reflective layer, a recording layer and an optical-transparent bonding layer may be formed between the optical-transparent bonding layer and the optical transparent sheet, for double-layer configuration.

The total thickness of the optical-transparent bonding layer and the optical transparent sheet is 0.1 mm and the peak-to peak height of wrinkles formed on the sheet is 2.5 $\mu$m or lower in this configuration.

The optical disk according to the present invention will exhibit surface vibration of 2.5 $\mu$m or lower, thus focusing errors being correctable.

Moreover, a method of producing an optical disk includes the steps of: radiating a first ultraviolet ray to an optical transparent sheet at a first energy level; preparing a substrate laminated on which are a reflective layer and a recording layer in this order; applying ultraviolet hardened resin on the recording layer to form an optical-transparent bonding layer thereon; providing the optical transparent sheet on the optical-transparent bonding layer; and radiating a second ultraviolet ray to the optical transparent sheet at a second energy level the same as or lower than the first energy level, to harden the optical-transparent bonding layer, thus the optical transparent sheet being bonded on the substrate via the optical-transparent bonding layer.

The wavelength of the first ultraviolet ray is in the range from 250 nm to 300 nm. The first energy level is adjusted in the range from 500 mJ/cm$^2$ to 3000 mJ/cm$^2$, thus suppressing wrinkles on the optical transparent sheet at the peak-to-peak height of 2.5 μm or lower.

What is claimed is:

1. An optical disk to be used in recording or reproduction of information with an optical pickup, while being rotated comprising:

a first reflective layer formed on a substrate;

a first recording layer formed on the first reflective layer;

a first optical-transparent bonding layer formed on the first recording layer; and an optical transparent sheet formed on the first optical-transparent bonding layer, the total thickness of the optical-transparent bonding layer and the optical transparent sheet being 0.1 mm, the peak-to-peak height of wrinkles formed on the sheet being 2.5 μm or lower to suppress surface vibration of the optical disk while being rotated to or lower than a specific level.

2. The optical disk according to claim 1, wherein the specific level of the surface vibration is 0.09 μm.

3. An optical disk comprising:

first reflective layer formed on a substrate;

a first recording layer formed on the first reflective layer;

a first optical-transparent bonding layer formed on the first recording layer;

an optical transparent sheet formed on the first optical-transparent bonding layer the total thickness of the optical-transparent bonding layer and the optical transparent sheet being 0.1 mm. the peak-to-peak height of wrinkles formed on the sheet being 2.5 μm or lower; and a second reflective layer, a second recording layer and a second optical-transparent bonding layer laminated in this order between the first optical-transparent bonding layer and the optical transparent sheet.

* * * * *